US012801490B2

(12) United States Patent
Huang et al.

(10) Patent No.: US 12,801,490 B2
(45) Date of Patent: Nov. 17, 2026

(54) APPROACH UNIFORM NAND CELL STATE TRANSITION OVER PROGRAM ERASE CYCLES USING LOOK UP TABLE

(71) Applicant: SK hynix Inc., Gyeonggi-do (KR)

(72) Inventors: Pengfei Huang, San Jose, CA (US); Fan Zhang, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 141 days.

(21) Appl. No.: 18/747,796

(22) Filed: Jun. 19, 2024

(65) Prior Publication Data

US 2025/0390379 A1 Dec. 25, 2025

(51) Int. Cl.
*G06F 11/10* (2006.01)
*G06F 3/06* (2006.01)

(52) U.S. Cl.
CPC ........ *G06F 11/1044* (2013.01); *G06F 3/0619* (2013.01); *G06F 11/1068* (2013.01); *G06F 11/1072* (2013.01)

(58) Field of Classification Search
CPC ............. G06F 11/1044; G06F 11/1068; G06F 11/1072; G06F 3/0619
See application file for complete search history.

(56) References Cited

U.S. PATENT DOCUMENTS

2010/0037008 A1* 2/2010 Hattori ................ G06F 12/0246 711/E12.001
2010/0287427 A1* 11/2010 Kim ........................ G06F 11/00 714/E11.147
2013/0227213 A1* 8/2013 Choi ......................... G06F 5/08 711/109
2018/0074791 A1* 3/2018 Atsumi ................... G06F 7/584
2019/0295659 A1* 9/2019 Hong ................... G11C 29/028
2021/0225451 A1 7/2021 Seo et al.
2022/0139488 A1* 5/2022 Alam ..................... G11C 29/42 365/185.09
2023/0315623 A1 10/2023 Chen et al.
2025/0356887 A1* 11/2025 Huang .................... G06F 7/582

* cited by examiner

*Primary Examiner* — Joseph O Schell
(74) *Attorney, Agent, or Firm* — IP&T GROUP LLP

(57) ABSTRACT

A method and associated memory system for randomizing memory storage data. The method and system receive at a data inverter user data and meta data sequence having an inversion seed bit, determine a value for the inversion seed bit from a look up table specifying inversion seeds for different pages of data to be stored in a memory, depending on the value of the inversion seed bit, bit-flip the user data and meta data sequence except for the inversion seed bit; and regardless of bit-flipping, exclusive OR (XOR) the user data and meta data sequence with a random sequence to produce an XORed sequence for storage in the memory as randomized data.

20 Claims, 11 Drawing Sheets

| | P0 | P1 | P2 | P3 | P4 | P5 | P6 | P7 |
|---|---|---|---|---|---|---|---|---|
| MSB | 1 | 0 | 0 | 0 | 0 | 1 | 1 | 1 |
| CSB | 1 | 1 | 0 | 0 | 1 | 1 | 0 | 0 |
| LSB | 1 | 1 | 1 | 0 | 0 | 0 | 0 | 1 |

FIG. 10

| N-1 \ N | P0 | P1 | P2 | P3 | P4 | P5 | P6 | P7 |
|---|---|---|---|---|---|---|---|---|
| P0 | 0 | 0 | 0 | 0 | 0 | 4684 | 0 | 0 |
| P1 | 0 | 0 | 0 | 0 | 4675 | 0 | 0 | 0 |
| P2 | 0 | 0 | 0 | 4581 | 0 | 0 | 0 | 0 |
| P3 | 0 | 0 | 4490 | 0 | 0 | 0 | 0 | 0 |
| P4 | 0 | 4649 | 0 | 0 | 0 | 0 | 0 | 0 |
| P5 | 4638 | 0 | 0 | 0 | 0 | 0 | 0 | 0 |
| P6 | 0 | 0 | 0 | 0 | 0 | 0 | 0 | 4584 |
| P7 | 0 | 0 | 0 | 0 | 0 | 0 | 4563 | 0 |

APPROACH UNIFORM NAND CELL STATE TRANSITION OVER PROGRAM ERASE CYCLES USING LOOK UP TABLE

BACKGROUND

1. Field

The present invention relates to the writing of data to a solid-state drive (SSD) memory device.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices. Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

The SSD may include flash memory components and a controller, which includes the electronics that bridge the flash memory components to the SSD input/output (I/O) interfaces. The SSD controller can include an embedded processor that can execute functional components such as firmware. The SSD functional components are device specific, and in most cases, can be updated. The two main types of flash memory components are named after the NAND and NOR logic gates. The individual flash memory cells exhibit internal characteristics similar to those of their corresponding gates. The NAND-type flash memory may be written and read in blocks (or pages) which are generally much smaller than the entire memory space. The NOR-type flash allows a single machine word (byte) to be written to an erased location or read independently. The NAND-type operates primarily in memory cards, USB flash drives, solid-state drives, and similar products, for general storage and transfer of data.

In this context, embodiments of the present invention arise.

SUMMARY

In accordance with one embodiment of the invention, there is provided a method for randomizing memory storage data. The method receives at a data inverter user data and meta data sequence having an inversion seed bit, determines a value for the inversion seed bit from a look up table specifying inversion seeds for different pages of data to be stored in a memory, depending on the value of the inversion seed bit, bit-flips the user data and meta data sequence except for the inversion seed bit; and regardless of bit-flipping, exclusive ORing (XORing) the user data and meta data sequence with a random sequence to produce an XORed sequence for storage in the memory as randomized data XORs the user data and meta data sequence with a random sequence to produce an XORed sequence for storage in the memory as randomized data.

In accordance with another embodiment of the invention, there is provided a memory system comprising a memory; a randomizer coupled to the memory; and a data inverter coupled to the randomizer, wherein the data inverter is configured to: receive a data sequence including user data and meta data having an inversion seed bit; determine a value for the inversion seed bit from a look up table specifying inversion seeds for different pages of data to be stored in the memory; and depending on the value of the inversion seed, bit-flip the data sequence except for the inversion seed bit. The randomizer is configured, regardless of bit-flipping, to exclusive OR (XOR) the data sequence with a random sequence R for storage in the memory as randomized data.

BRIEF DESCRIPTION OF THE DRAWINGS

FIG. 10 is a diagram illustrating a cell transition matrix in accordance with embodiments of the present invention showing the numbers of cell transitions from one program state at previous erase-program cycle to another program state at a current erase-program cycle.

DETAILED DESCRIPTION

Figure 1:
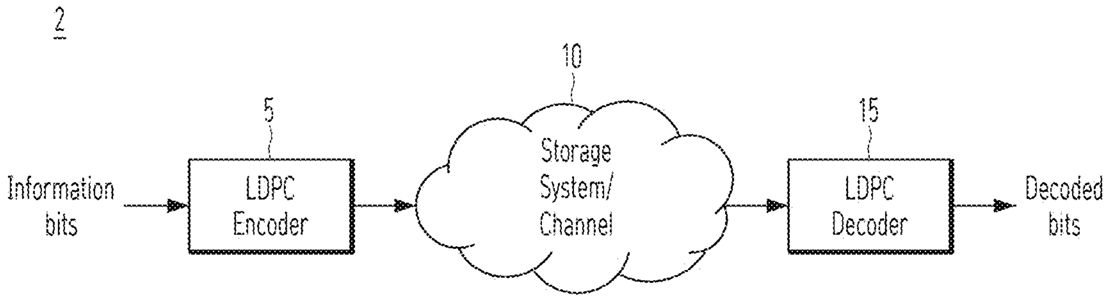
FIG. 1 is a high level block diagram illustrating an error correcting system in accordance with embodiments of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention encompasses numerous alternatives, modifications and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

FIG. 1 is a high-level block diagram illustrating an error correcting system 2, in accordance with embodiments of the present invention. More specifically, the high-level block diagram in FIG. 1 shows error correcting system 2 including an encoder 5 and a decoder 15 using for example LDPC coding and decoding algorithms. That is, error correcting system 2 may include a LDPC encoder 5 and a LDPC decoder 15, although other coding and decoding algorithms can be used.

Figure 2:
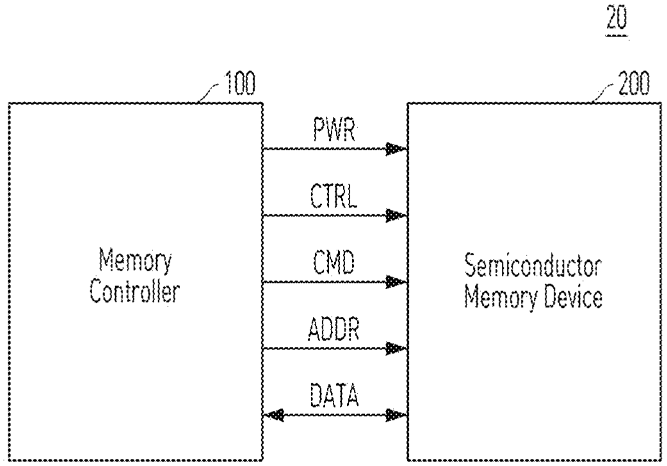
FIG. 2 is a block diagram schematically illustrating a memory system in accordance with embodiments of the present invention.

The LDPC encoder 5 may receive information bits including data which is desired to be stored in a storage system 10 (such as in memory system 20 of FIG. 2). The LDPC encoder 5 may encode the information bits to output LDPC encoded data. The LDPC encoded data from the LDPC encoder 5 may be written to a storage device or memory device of the storage system 10. In various embodiments, the storage device may include a variety of storage types or media. In some embodiments, during being written to or read from the storage device, data is transmitted and received over a wired and/or wireless channel. In this case, the errors in the received codeword may be introduced during transmission of the codeword.

When the stored data in the storage system 10 is requested or otherwise desired (e.g., by an application or user which stored the data), the LDPC decoder 15 may perform LDPC decoding data received from the storage system 10, which may include some noise or errors. In various embodiments, the LDPC decoder 15 may perform LDPC decoding using the decision and/or reliability information for the received data. The decoded bits generated by the LDPC decoder 15 are transmitted to the appropriate entity (e.g., the user or application which requested it). With proper encoding and decoding, the information bits match the decoded bits.

FIG. 2 is a block diagram schematically illustrating a memory system 20 in accordance with an embodiment of the present invention.

Referring FIG. 2, the memory system 20 may include a memory controller 100 and a semiconductor memory device 200.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal may include a command latch enable (CLE) signal, an address latch enable (ALE) signal, a chip enable (CE) signal, a write enable (WE) signal, a read enable (RE) signal, and so on.

The memory controller 100 and the semiconductor memory device 200 may be integrated in a single semiconductor device. For example, the memory controller 100 and the semiconductor memory device 200 may be integrated in a single semiconductor device such as an SSD. The solid state drive may include a storage device for storing data therein. When the semiconductor memory system 20 is used in an SSD, operation speed of a host (not shown) coupled to the memory system 20 may remarkably improve.

The memory controller 100 and the semiconductor memory device 200 may be integrated in a single semiconductor device such as a memory card. For example, the memory controller 100 and the semiconductor memory device 200 may be integrated in a single semiconductor device to configure a memory card such as a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and a universal flash storage (UFS).

For another example, the memory system 20 may be provided as one of various elements including an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, one of electronic devices of a home network, one of electronic devices of a computer network, one of electronic devices of a telematics network, a radio-frequency identification (RFID) device, or elements devices of a computing system.

Figure 3:
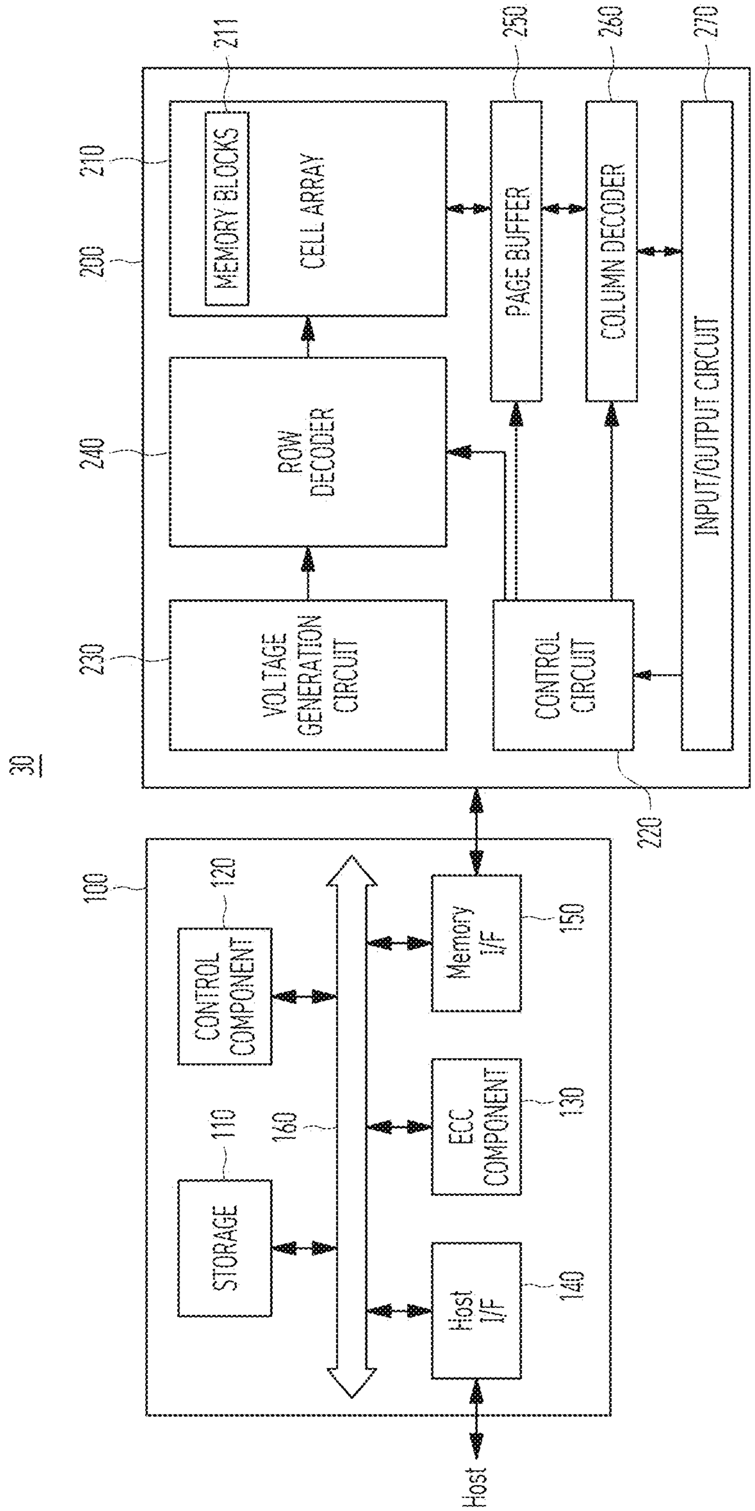
FIG. 3 is a block diagram illustrating a memory system in accordance with embodiments of the present invention.

FIG. 3 is a detailed block diagram illustrating various embodiments of memory system 30 in accordance with one embodiment of the present invention. For example, memory system 30 of FIG. 3 may depict the storage system 10 shown in FIG. 1 or the memory system 20 shown in FIG. 2.

Referring to FIG. 3, the memory system 30 may include the memory controller 100 and the semiconductor memory device 200.

The memory system 30 may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, a digital video recorder and a digital video player. In some embodiments, the host device may include a portable electronic device such as a mobile phone, a smart phone, an e-book, an MP3 player, a portable multimedia player (PMP), and a portable game player.

The memory device 200 may store data to be accessed by the host device.

The memory device 200 may be implemented with a volatile memory device such as a dynamic random access memory (DRAM) and a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The controller 100 may control storage of data in the memory device 200. For example, the controller 100 may control the memory device 200 in response to a request from the host. The controller 100 may provide the data read from the memory device 200, to the host, and store the data provided from the host into the memory device 200.

The controller 100 may include a storage unit 110, a control component 120, the error correction code (ECC) component 130, a host interface (I/F) 140 and a memory interface (I/F) 150, which are coupled through a bus 160.

The storage unit 110 may serve as a working memory of the memory system 10 and the controller 100, and store data for driving the memory system 10 and the controller 100. When the controller 100 controls operations of the memory device 200, the storage unit 110 may store data used by the controller 100 and the memory device 200 for such operations as read, write, program and erase operations.

The storage unit 110 may be implemented with a volatile memory. The storage unit 110 may be implemented with a static random access memory (SRAM) or a dynamic random access memory (DRAM). As described above, the storage unit 110 may store data used by the host device in the memory device 200 for the read and write operations. To store the data, the storage unit 110 may include a program memory, a data memory, a write buffer, a read buffer, a map buffer, and so forth.

Referring to FIG. 3, the control component 120 may control general operations of the memory system 30, and a write operation or a read operation for the memory device 200, in response to a write request or a read request from the host device. The control component 120 may drive firmware, which is referred to as a flash translation layer (FTL), to control the general operations of the memory system 10. For example, the FTL may perform operations such as logical to physical (L2P) mapping, wear leveling, garbage collection, and bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and may output an error correction fail signal indicating failure in correcting the error bits.

In some embodiments, the ECC component 130 may perform an error correction operation based on a coded modulation such as an LDPC code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), a Block coded modulation (BCM), and so on. The ECC component 130 may include all circuits, systems or devices for the error correction operation.

As shown in FIG. 3, host interface 140 may communicate with the host device through one or more of various interface protocols such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control unit (e.g., CPU) 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250, a column decoder 260, and an input/output circuit 270. The memory cell array 210 may include a plurality of memory blocks 211 and may store data therein. The voltage generation circuit 230, the row decoder 240, the page buffer 250, the column decoder 260 and the input/output circuit 270 form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages having various levels. For example, in an erase operation, the voltage generation circuit 230 may generate operation voltages having various levels such as an erase voltage and a pass voltage.

The row decoder 240 may be connected to the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks among the plurality of memory blocks 211.

The page buffer 250 may be connected to the memory cell array 210 through bit lines BL (not shown). The page buffer 250 may precharge the bit lines BL with a positive voltage, transmit/receive data to/from a selected memory block in program and read operations, or temporarily store transmitted data, in response to a page buffer control signal generated by the control circuit 220.

The column decoder 260 may transmit/receive data to/from the page buffer 250 or transmit/receive data to/from the input/output circuit 270.

The input/output circuit 270 may transmit, to the control circuit 220, a command and an address, transmitted from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

Figure 4A:
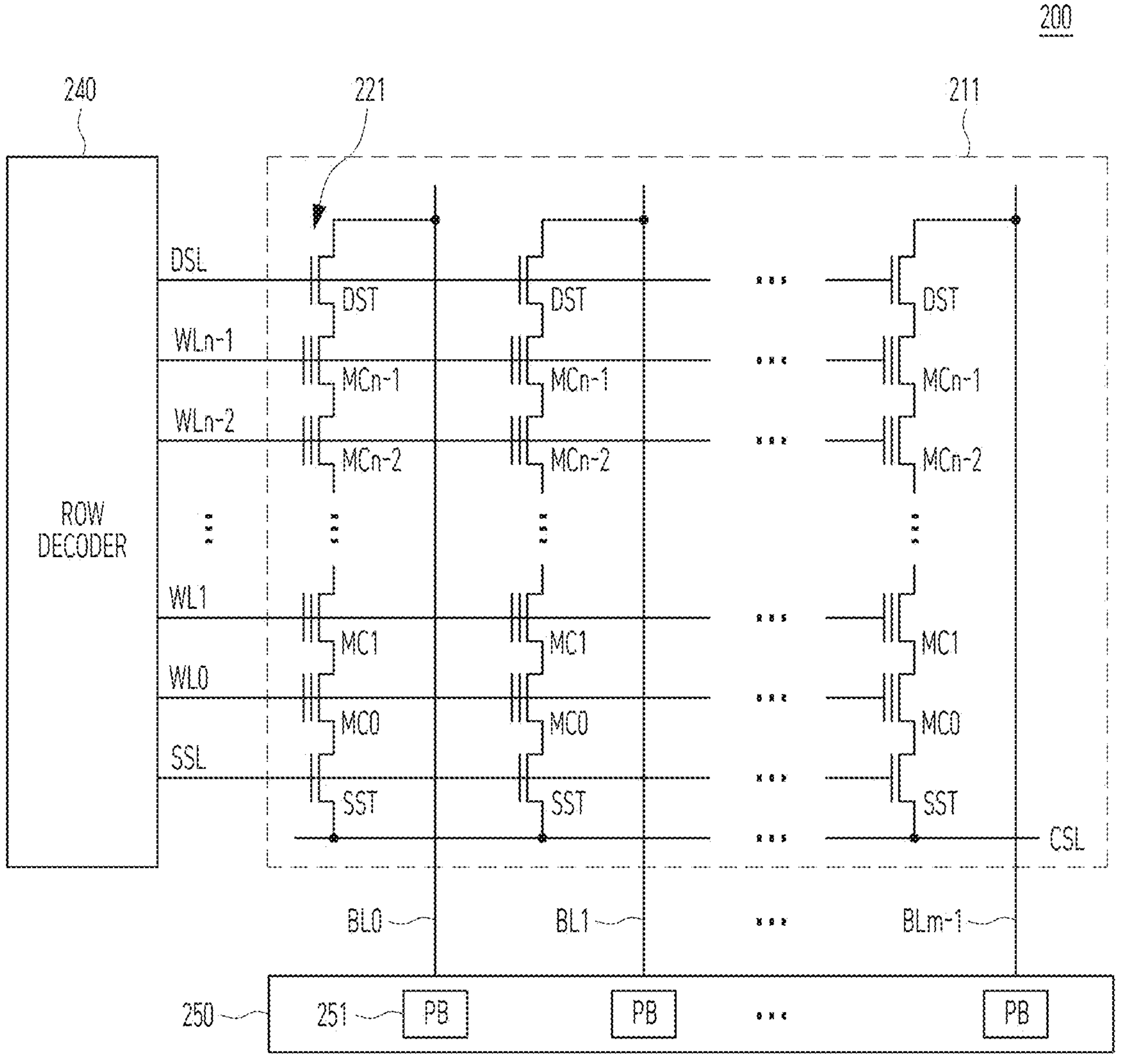
FIG. 4A is a circuit diagram illustrating a memory block of a memory device in accordance with embodiments of the present invention.

FIG. 4A is a circuit diagram illustrating a memory block of a semiconductor memory device in accordance with an embodiment of the present invention. For example, a memory block of FIG. 4A may be the memory blocks 211 of the memory cell array 210 shown in FIG. 3.

Referring to FIG. 4A, the memory blocks 211 may include a plurality of cell strings 221 coupled to bit lines BL0 to BLm−1, respectively. The cell string of each column may include one or more drain selection transistors DST and one or more source selection transistors SST. A plurality of memory cells or memory cell transistors may be serially coupled between the selection transistors DST and SST. Each of the memory cells MC0 to MCn−1 may be formed of a multi-level cell (MLC) storing data information of multiple bits in each cell. The cell strings 221 may be electrically coupled to the corresponding bit lines BL0 to BLm−1, respectively.

In some embodiments, the memory blocks 211 may include a NAND-type flash memory cell. However, the memory blocks 211 are not limited to the NAND flash memory, but may include NOR-type flash memory, hybrid flash memory in which two or more types of memory cells are combined, and one-NAND flash memory in which a controller is embedded inside a memory chip.

Referring back to FIGS. 3 and 4A, the memory device 200 may include a plurality of memory cells (e.g., NAND flash memory cells). The memory cells are arranged in an array of rows and columns as shown in FIG. 4A. The cells in each row are connected to a word line (e.g., WL0), while the cells in each column are coupled to a bit line (e.g., BL0). These word and bit lines are used for read and write operations. During a write operation, the data to be written ('1' or '0') is provided at the bit line while the word line is addressed. During a read operation, the word line is again addressed, and the threshold voltage of each cell can then be acquired from the bit line. Multiple pages may share the memory cells that belong to (i.e., are coupled to) the same word line. When the memory cells are implemented with MLCs, the multiple pages include a most significant bit (MSB) page and a least significant bit (LSB) page. When the memory cells are implemented with triple-level cells (TLCs), the multiple pages include an MSB page, a center significant bit (CSB) page and an LSB page. When the memory cells are implemented with quadruple level cell (QLCs), the multiple pages include an MSB page, a center most significant bit (CMSB) page, a center least significant bit (CLSB) page and an LSB page. The memory cells may be programmed for example using a coding scheme (e.g., Gray coding) in order to increase the capacity of the memory system 10 such as SSD.

Figure 4B:
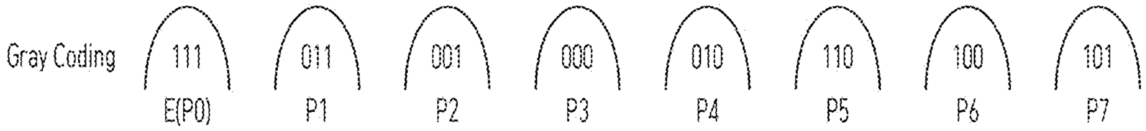
FIG. 4B is a diagram illustrating one example of Gray coding for a triple-level cell (TLC) in accordance with another embodiment of the present invention.

FIG. 4B is a diagram illustrating an example of Gray coding for a triple-level cell (TLC).

Referring to FIG. 4B, a TLC may be programmed using Gray coding. A TLC may have 8 program states, which include an erased state E (or P0) and a first program state P1 to a seventh program state P7. The erased state E (or P0) may correspond to "111." The first program state P1 may correspond to "011." The second program state P2 may correspond to "001." The third program state P3 may correspond to "000." The fourth program state P4 may correspond to "010." The fifth program state P5 may correspond to "110." The sixth program state P6 may correspond to "100." The seventh program state P7 may correspond to "101."

Figure 4C:
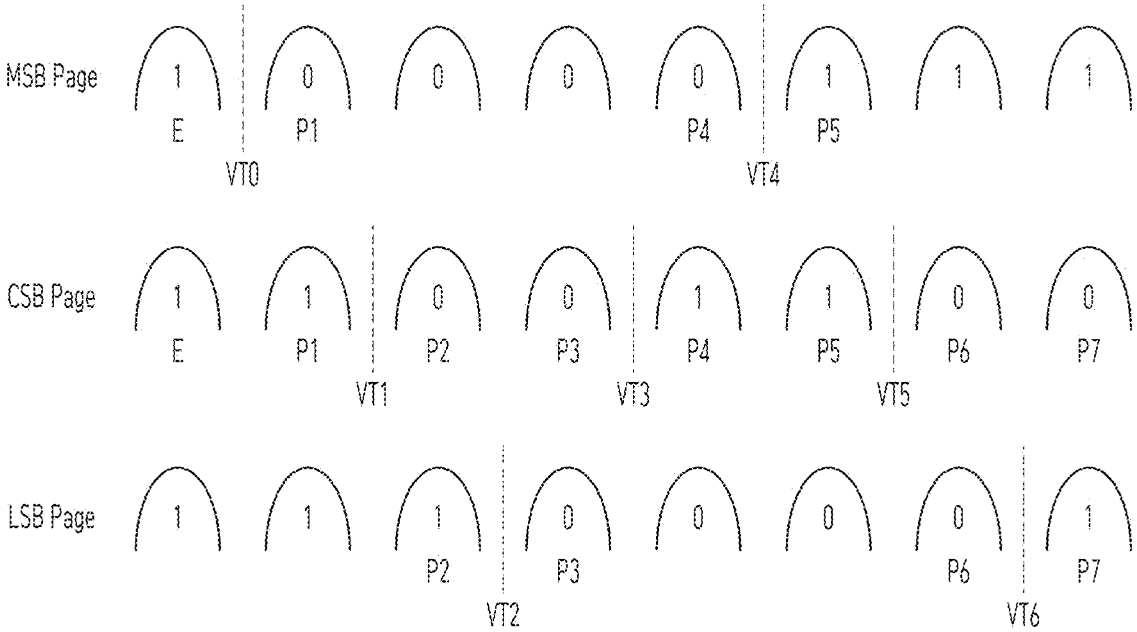
FIG. 4C is a diagram illustrating state distributions for pages of a triple-level cell (TLC) in accordance with another embodiment of the present invention.

In the TLC, as shown in FIG. 4C, there are 3 types of pages including LSB, CSB and MSB pages. 2 or 3 thresholds may be applied in order to retrieve data from the TLC. For an MSB page, 2 thresholds include a threshold value VT0 that distinguishes between an erase state E and a first program state P1 and a threshold value VT4 that distinguishes between a fourth program state P4 and a fifth program state P5. For a CSB page, 3 thresholds include VT1, VT3 and VT5. VT1 distinguishes between a first program state P1 and a second program state P2. VT3 distinguishes between a third program state P3 and the fourth program state P4. VT5 distinguishes between the fourth program state P5 and the sixth program state P6. For an LSB page, 2 thresholds include VT2 and VT6. VT2 distinguishes between the second program state P2 and the third program state 3. VT6 distinguishes between the sixth program state P6 and a seventh program state P7.

The present invention recognizes that writing the same data pattern makes an SSD wear out faster than the programming of a random data pattern. To promote the randomness of the data programmed to NAND, a scrambler or randomizer is often applied to randomize the data that comes from host before the NAND write operation.

However, the output sequence of a scrambler is controlled by its input seed which is usually determined by a physical address where the data will be programmed is controlled by its input seed which is usually determined by a physical address where the data, the output sequence of a scrambler will be programmed. Consider a scenario that always writes the same host data to a fixed physical address, e.g., writes the same host data to a particular word line. In this case, the data pattern to be programmed is also fixed. As a result, this operation through repetitive program erase cycles (PECs) can wear out a particular word line, causing endurance and reliability issues.

To address this issue, an inversion seed can be used to flip the fixed data on each page of the storage device such a NAND page. In this way, the state of each NAND cell can be randomized. However, over extensive program erase cycles, the present invention recognized that current bit-flipping schemes can cause non-uniform NAND cell state transition(s) which can lead to for example shallow erase issues which occur when a large number of high state cells are erased. Many cells can be in the shallow erase range when a large number of high states (e.g., P6, P7 in FIG. 7) in a memory block are changed to an erase state. This effect increases the fail bit counts of the erase state and makes the memory cell vulnerable for disturbances.

In one embodiment of the present invention, a look-up-table (LUT) is used to determine a value for an inversion seed for different pages in a storage device such as for example the most significant bit (MSB), the center significant bit (CSB), and the least significant bit (LSB) for example in a triple level cell (TLC) NAND. The inversion seed is an entry in a pre-determined LUT. To find this entry for a certain page, a modulo operation (PEC+PA) % m generates the row index of LUT, and the page type determines the entry on the row.

In one embodiment, the LUT (used to determine the value of the inversion seed) only requires a small amount of SRAM for storage of the LUT and can be implemented in firmware (FW). Simulation results show this inventive LUT-based procedure is effective in generating uniform NAND cell state transitions over the PECs of the storage device.

ERN Architecture

Figure 5:
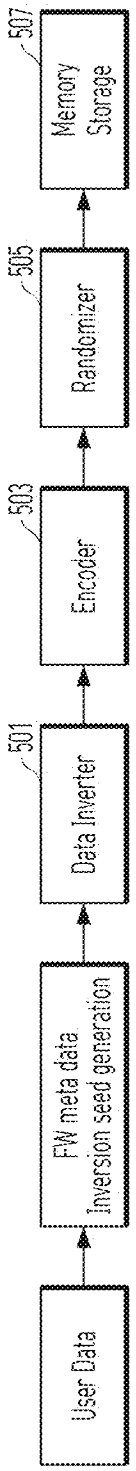
FIG. 5 is a diagram illustrating an encoder-randomizer-NAND (ERN) architecture in accordance with embodiments of the present invention.
Figure 6:
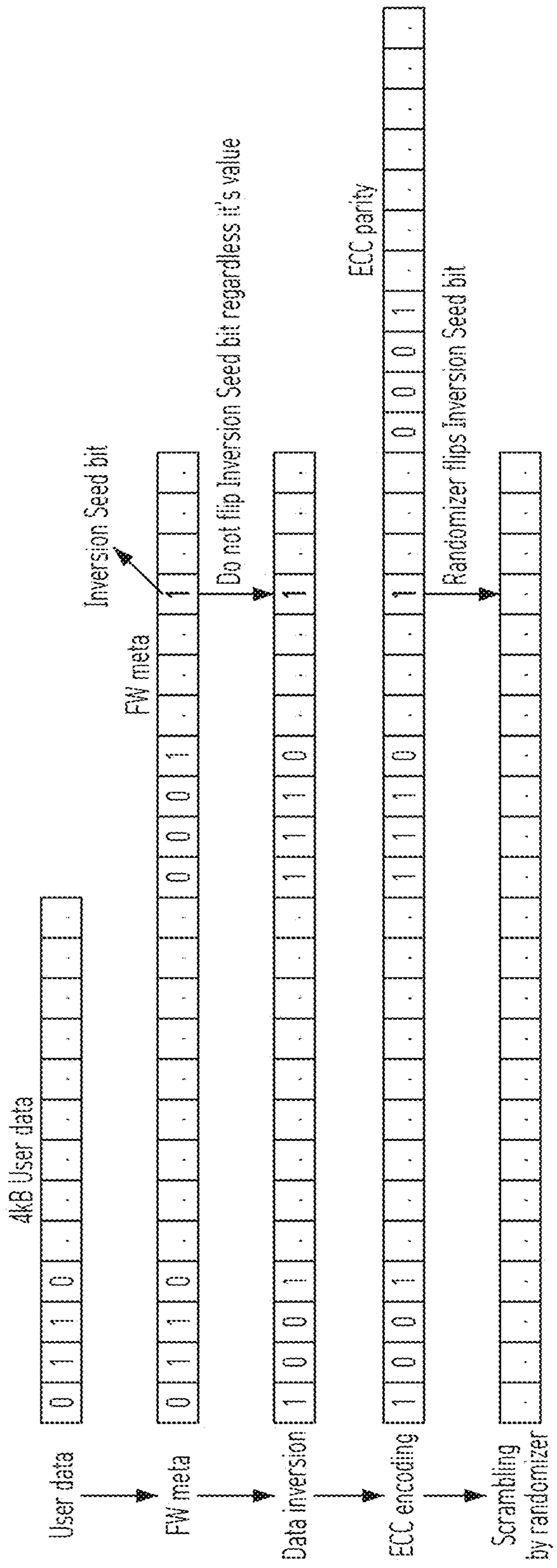
FIG. 6 is a diagram illustrating a write path in accordance with embodiments of the present invention.
Figures 7, 8:
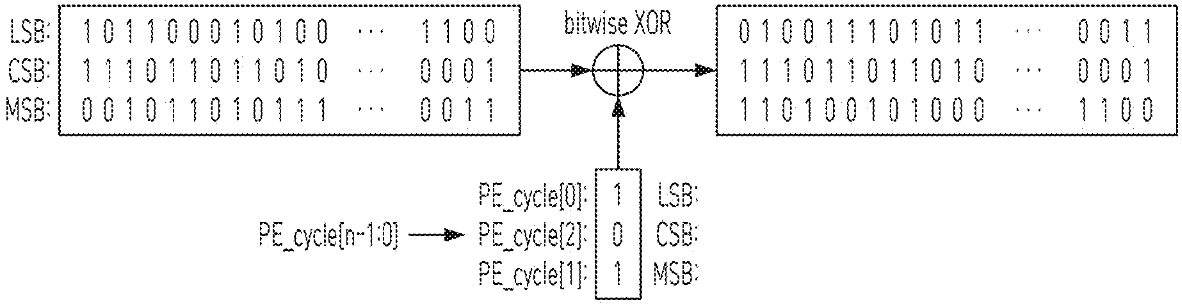
FIG. 7 is a diagram illustrating program states for pages in a TLC in accordance with embodiments of the present invention.
FIG. 8 is a diagram illustrating an example of inversion bit-flipping in accordance with embodiments of the present invention.

FIG. 5 is a diagram illustrating an encoder-randomizer-NAND (ERN) architecture. As shown in FIG. 5, in the ERN architecture, the user data with FW meta data is first sent to an encoder 503 (e.g., a LDPC encoder), and then is sent to randomizer 505 (e.g. a scrambler), and finally is sent to storage 507 (e.g. a NAND device). The data flow write path of the ERN architecture is described in FIG. 6. In the FW meta data section, there is an inversion seed bit. If the inversion seed bit is 1, all the bits are flipped (inverted) except the inversion seed bit; otherwise, no action is taken to invert any of the bits. FIG. 7 is a diagram showing the program states P0, P1, P2, P3, P4, P5, P6, P7 for a TLC. For each page (MSB, CSB, and LSB shown in FIG. 7), there is an associated inversion seed (determined by the LUT) having a value ("1" or "0") which controls whether to bit-flip the sequence on that page (that is to bit-flip one or more the bits in the P0, P1, . . . . P7 cell states of the TLC). Bit-flipping one of the bits in one of the program states effectively transitions that state from an initial state (for example P2) to a final state (for example P3) if the LSB of P2 is bit-flipped from "1" to "0". Even with fixed host data, this inventive procedure can produce a randomized output by using different inversion seeds for different pages and/or for different PEC counts.

Existing Scheme:

With existing schemes, the inversion seed of each page is determined by PEC values. The PEC value is expressed in binary, where PEC[0] denotes the first bit from right, PEC[2] denotes the third bit from right, and PEC[1] denotes the second bit from right. The inversion seed of each page is calculated as follows:

$$\text{MSB\_Inversion\_Seed} = PEC[1]$$

$$\text{CSB\_Inversion\_Seed} = PEC[2]$$

$$\text{LSB\_Inversion\_Seed} = PEC[0]$$

FIG. 8 is a diagram illustrating an example of inversion bit-flipping in accordance with embodiments of the present invention. As shown in FIG. 8, the LSB Inversion Seed is "1", which is the first bit from right of the PEC value, so the LSB data is also flipped. The CSB Inversion Seed is "0" which is the third bit from right of the PEC value, so no flip occurs for the CSB data. The MSB Inversion Seed is "1", which is the second bit from right of the PEC value, so the MSB data is flipped. This scheme randomizes the state of a cell. However, it fails to generate uniform NAND cell state transitions over accumulated PECs (e.g., over 11,000 PECs).

Figure 9:
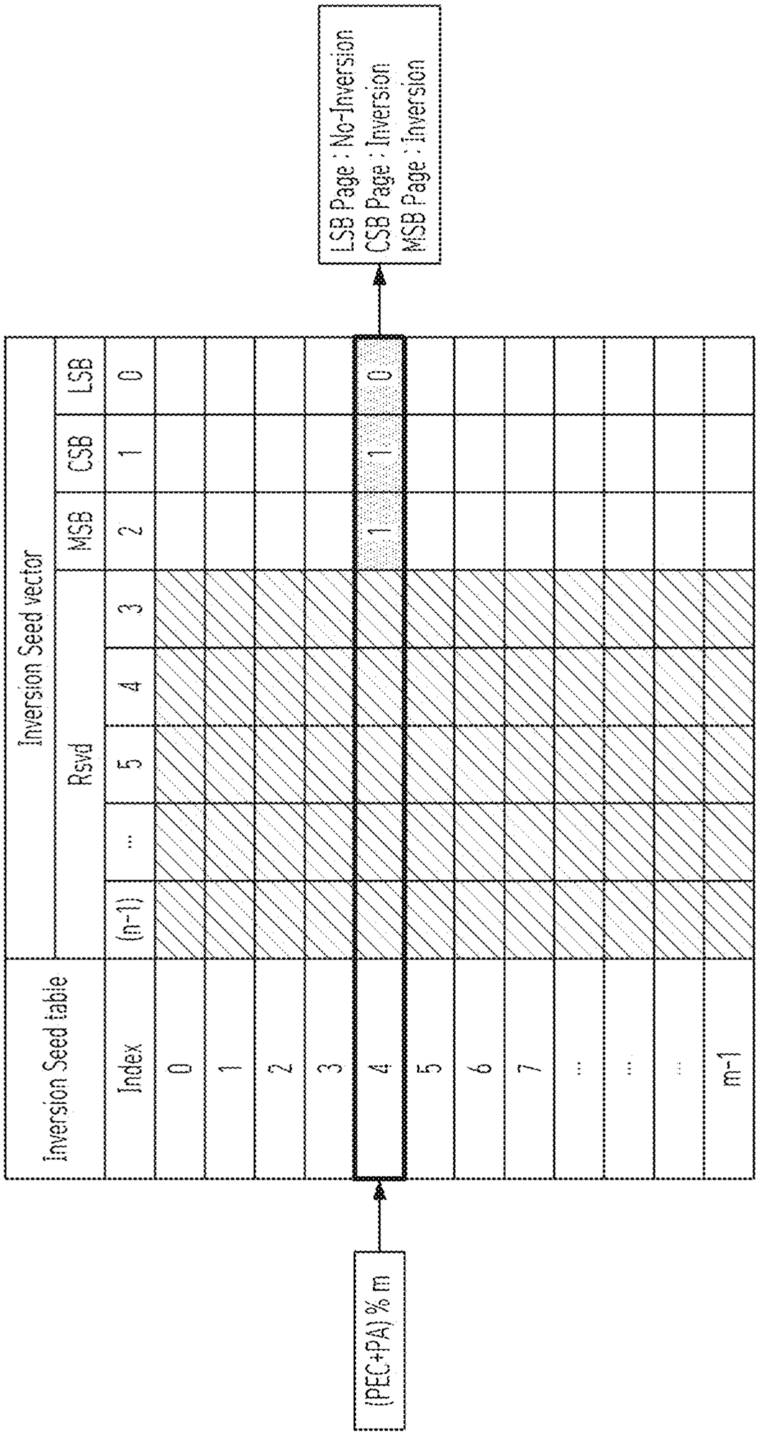
FIG. 9 is a diagram illustrating an inversion seed table in accordance with embodiments of the present invention.

LUT Scheme:

FIG. 9 is a diagram illustrating an inversion seed table in accordance with embodiments of the present invention. In the table of size m*n shown in FIG. 9, to generate inversion seeds of the pages, (PEC+PA) % m is used to determine the row of LUT (i.e., inversion seed vector). The last three bits of the inversion seed vector contain the inversion seeds for the MSB, CSB, LSB pages. With the LUT table shown in FIG. 9, where Rsvd refers to reserved bits in the inversion seed vector, the inversion seeds of the MSB, CSB, LSB pages are determined as follows:

$$idx = (PEC + PA)\,\%\,m$$

$$\text{Inversion\_Seed\_Vector} = LUT[idx]$$

$$\text{MSB\_Inversion\_Seed} = \text{Inversion\_Seed\_Vector}[2]$$

$$\text{CSB\_Inversion\_Seed} = \text{Inversion\_Seed\_Vector}[1]$$

$$\text{LSB\_Inversion\_Seed} = \text{Inversion\_Seed\_Vector}[0],$$

where Inversion_Seed_Vector[0], Inversion_Seed_Vector[1], Inversion_Seed_Vector[2] represent the first, second, and third bits from the rightmost end of Inversion_Seed_Vector. As shown in FIG. 9, the first, second, and third bits from the rightmost end of Inversion_Seed_Vector have values 0 for LSB, 1 for CSB, and 1 for MSB for the index value of 4. Thus, for the $4^{th}$ index, bits to be written to the MSB page and the CSB page are flipped, and the bits to be written to the LSB page are not flipped.

Note that for a TLC NAND, n=3 is enough to randomize the state transitions. The value m determines the number of rows of the LUT. A small m costs less memory (e.g., SRAM) for storage of the LUT. The LUT look up operation can be implemented in FW.

LUT Table

LUT table can be randomly generated according to a binomial distribution with parameters (m*n, ½); that is the binomial distribution sets "0" or "1" with equal probability for each entry of the LUT. In one embodiment of the present invention, a relatively large table size (e.g., for m=512) can achieve uniform accumulated cell state transitions over PECs. By uniform accumulated cell state transitions, when bits for the MSB, CSB, and LSB are flipped, the program state of the TLC NAND changes from one of the P0, P1, . . . . P7 cell states to another one of those cell states. In one embodiment of the present invention, the number of cell state transitions P0 to P1, or P2 to P3, etc., is evenly distributed in order not to prematurely wear the memory device.

In one embodiment of the present invention, a relatively small LUT table can be obtained by the construction as follows. For a sequence of $X_0, X_1, X_2, \ldots, X_{64t-1}, X_{64t}$, where each element belongs to the set {0, 1, 2, 3, 4, 5, 6, 7} and t is an integer, an associated matrix P is calculated with the procedure below:

```
1.  Initialize P[i,j] = 0 for all i=0,1,2,...,7 and j=0,1,2,...,7
2.  Accumulate P[i,j] as follows:
    For k = 0, 1, ..., 64t−1:
    P[X_k, X_{k+1}]= P[X_k, X_{k+1}]+1
    End
```

A sequence of $X_0, X_1, X_2, \ldots, X_{64t-1}, X_{64t}$ is constructed such that P[i,j]=t for all i=0, 1, 2, . . . , 7 and j=0, 1, 2, . . . , 7. Then, a LUT of size 64t*3 can be formed from the sequence. The k-th row (k=1, 2, . . . , 64t, corresponding row idx=0, 1, 2, . . . , 64t−1) of LUT is $X_k$ in a binary expression (containing 3 bits for MSB, CSB, and LSB).

One 64*3 LUT table is illustrated below. This LUT is able to generate uniform accumulated cell state transitions over for example the 11,000 PECs noted above. In this table, when the user data is to be stored at a physical address PA and the value for PEC at that address are known the modulo operation (PEC+PA) % m determines the idx value, and the LUT below (e.g., stored in Data Inverter 501 or stored in control circuit 220) then determines the inversion seeds for MSB, CSB, and LSB pages.

TABLE 1

Inversion Seed Generation Table

| idx | MSB | CSB | LSB |
|---|---|---|---|
| 0 | 1 | 1 | 1 |
| 1 | 1 | 1 | 1 |
| 2 | 1 | 1 | 0 |
| 3 | 1 | 1 | 1 |
| 4 | 1 | 0 | 1 |
| 5 | 1 | 1 | 1 |
| 6 | 1 | 0 | 0 |
| 7 | 1 | 1 | 1 |
| 8 | 0 | 1 | 1 |
| 9 | 1 | 1 | 1 |
| 10 | 0 | 1 | 0 |
| 11 | 1 | 1 | 1 |
| 12 | 0 | 0 | 1 |
| 13 | 1 | 1 | 1 |
| 14 | 0 | 0 | 0 |
| 15 | 1 | 1 | 0 |
| 16 | 1 | 1 | 0 |
| 17 | 1 | 0 | 1 |
| 18 | 1 | 1 | 0 |
| 19 | 1 | 0 | 0 |
| 20 | 1 | 1 | 0 |
| 21 | 0 | 1 | 1 |
| 22 | 1 | 1 | 0 |
| 23 | 0 | 1 | 0 |
| 24 | 1 | 1 | 0 |
| 25 | 0 | 0 | 1 |
| 26 | 1 | 1 | 0 |
| 27 | 0 | 0 | 0 |
| 28 | 1 | 0 | 1 |
| 29 | 1 | 0 | 1 |
| 30 | 1 | 0 | 0 |
| 31 | 1 | 0 | 1 |
| 32 | 0 | 1 | 1 |
| 33 | 1 | 0 | 1 |
| 34 | 0 | 1 | 0 |
| 35 | 1 | 0 | 1 |
| 36 | 0 | 0 | 1 |
| 37 | 1 | 0 | 1 |
| 38 | 0 | 0 | 0 |
| 39 | 1 | 0 | 0 |
| 40 | 1 | 0 | 0 |
| 41 | 0 | 1 | 1 |
| 42 | 1 | 0 | 0 |
| 43 | 0 | 1 | 0 |
| 44 | 1 | 0 | 0 |
| 45 | 0 | 0 | 1 |
| 46 | 1 | 0 | 0 |
| 47 | 0 | 0 | 0 |
| 48 | 0 | 1 | 1 |
| 49 | 0 | 1 | 1 |
| 50 | 0 | 1 | 0 |

TABLE 1-continued

Inversion Seed Generation Table

| idx | MSB | CSB | LSB |
|---|---|---|---|
| 51 | 0 | 1 | 1 |
| 52 | 0 | 0 | 1 |
| 53 | 0 | 1 | 1 |
| 54 | 0 | 0 | 0 |
| 55 | 0 | 1 | 0 |
| 56 | 0 | 1 | 0 |
| 57 | 0 | 0 | 1 |
| 58 | 0 | 1 | 0 |
| 59 | 0 | 0 | 0 |
| 60 | 0 | 0 | 1 |
| 61 | 0 | 0 | 1 |
| 62 | 0 | 0 | 0 |
| 63 | 0 | 0 | 0 |

Simulation Results

For a TLC NAND with the eight program states P0, P1, . . . , P7 (noted above), cell state transition(s) from a previous erase and program operation to a current erase and program operation can be represented by an 8*8 state transition matrix. For example, FIG. 10 is a diagram illustrating a cell transition matrix in accordance with embodiments of the present invention showing the numbers of cell transitions from one program state at previous erase-program cycle to another program state at a current erase-program cycle. More specifically, FIG. 10 shows a TLC NAND cell state transition matrix of a previous erase-program cycle to a current erase program cycle. FIG. 10 shows that, from the (N−1)-th erase-program cycle to the N-th erase-program cycle, 4684 cells with state P0 are moved (transitioned) to state P5, 4675 cells with state P1 are moved (transitioned) to state P4.

One embodiment of the present invention obtains (or approaches) a uniform accumulated state transition matrix over a significant number of PECs where (without the inventive procedures described here) selected storages elements would wear more than other storage elements. In one embodiment of the present invention, the number of transitions from the initial program state to the final program state approaches uniformity between all program states in the memory. In one embodiment of the present invention, the number of transitions from the initial program state to the final program state is distributed between all program states in the memory with a deviation ranging from 0.01% to 2%.

The simulated results below are for one WL with 4608B bit lines, assuming that MSB, CSB, LSB data of length 4608B from a host satisfies a binomial distribution with p=0.5, but that the host data using the LUT from Table 1 is inverted (or not) over all PECs. The simulation results as shown in the following 8*8 state transition matrix shows the accumulated cell state transitions over 11,000 PECs. The 8*8 state transition matrix shows that the number of cell state transitions that occurred for each program state P0, P1, . . . , P7 for each row is quite uniform:

[[6327113. 6340608. 6340608. 6340608. 6340608. 6331609. 6331509. 6336069.]
[6340608. 6326489. 6335897. 6331239. 6331258. 6340608. 6340608. 6340608.]
[6340608. 6335916. 6326841. 6331401. 6331420. 6340608. 6340608. 6340608.]
[6340608. 6331239. 6331401. 6326962. 6335950. 6340608. 6340608. 6340608.]
[6340608. 6331258. 6331420. 6336112. 6326719. 6340608. 6340608. 6340608.]
[6331609. 6340608. 6340608. 6340608. 6340608. 6326898. 6335839. 6331400.]
[6331509. 6340608. 6340608. 6340608. 6340608. 6336048. 6326608. 6331300.]
[6336169. 6340608. 6340608. 6340608. 6340608. 6331400. 6331300. 6326642.]]

Extend to REN Architecture

Figure 11:
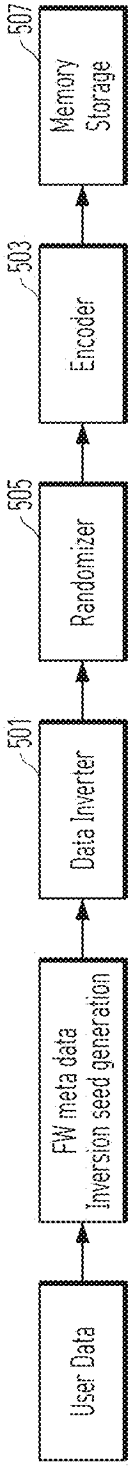
FIG. 11 is a diagram illustrating a randomizer-encoder-NAND (REN) architecture in accordance with embodiments of the present invention.

The inversion seed generation scheme based on a LUT can also be used in the REN architecture, as shown in FIG. 11. In the REN architecture, the user data with FW meta data first is sent to randomizer 505, and then is sent through encoder 503, and finally is sent to memory storage 507.

Extend to QLC NAND

The LUT table size can be adjusted to be compatible with a quadruple level cell (QLC) NAND that has four (4) page types, that of an MSB page, a center most significant bit (CMSB) page, a center least significant bit (CLSB) page and a least significant bit (LSB) page, and sixteen (16) program states P0, P1, . . . , P15.

For a sequence of $X_0, X_1, X_2, \ldots, X_{256t-1}, X_{256t}$, where each element belongs to the set {0, 1, 2, . . . , 15} and t is an integer, an associated matrix P is calculated with the procedure below:

```
1. Initialize P[i,j] = 0 for all i=0,1,2,...,15 and j=0,1,2,...,15
2. Accumulate P[i,j] as follows:
   For k = 0, 1, ..., 256t−1:
   P[X_k, X_{k+1}]= P[X_k, X_{k+1}]+1
   End
```

A sequence is constructed of $X_0, X_1, X_2, \ldots, X_{256t-1}, X_{256t}$ such that P[i,j]=t for all i=0, 1, 2, . . . , 15 and j=0, 1, 2, . . . , 15. Then a LUT of size 256t*4 can be formed from the sequence. The k-th row (k=1, 2, . . . , 256t, corresponding row idx=0, 1, 2, . . . , 256t−1) of LUT is X_k in binary expression (containing 4 bits for MSB, CMSB, CLSB, and LSB).

Computerized Method

Figure 12:
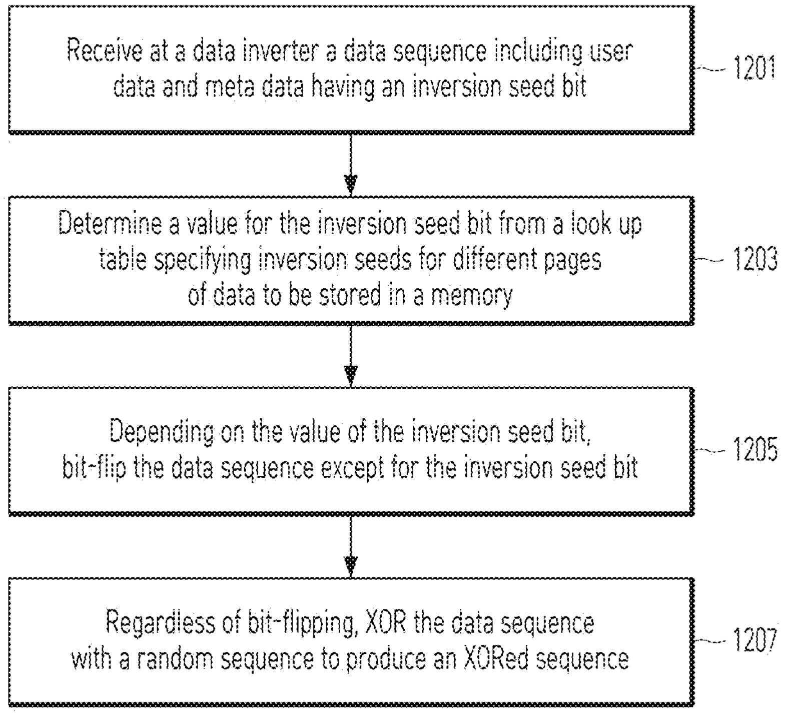
FIG. 12 is a flowchart illustrating one method for randomizing memory storage data in accordance with embodiments of the present invention.

In one embodiment of the present invention, there is provided a method (as depicted in FIG. 8) for randomizing memory storage data in FIG. 12. This method may be implemented in ECC component 130 or control circuit 220 of FIG. 2 or may be implemented in randomizer 505 of FIG. 5. In this method at 1201, a data sequence including user data and meta data having an inversion seed bit is received at a data inverter. At 1203, a value for the inversion seed bit is determined from a look up table specifying inversion seeds for different pages of data to be stored in a memory. At 1205, depending on the value of the inversion seed, the data sequence except for the inversion seed bit is bit-flipped. At 1209, regardless of bit-flipping, the data sequence is exclusive ORed (XORed) with a random sequence for storage in the memory as randomized data.

In one embodiment of this method, an error correction code is appended to the data sequence prior to the XORing of the data sequence with the random sequence. In this embodiment, the XORed sequence is stored in the memory as the randomized data.

In one embodiment of this method, an error correction code is appended to the data sequence after the XORing of the data sequence with the random sequence. In this method, the XORed sequence is stored in a memory as the randomized data.

In one embodiment of this method, the look up table comprises randomly generated entries generated with a seed comprising a) a physical address where the data sequence is to be stored in the memory and b) a program erase count for the physical address.

In one embodiment of this method, the look up table comprising the randomly generated entries comprises inversion seeds for each type of page data to be written to the physical address in the memory.

In one embodiment of this method, the memory is a triple-level cell (TLC) NAND device and the inversion seeds comprise inversion seeds for most significant bit, center significant bit, and least significant bit pages.

In one embodiment of this method, the memory is a quadruple-level cell NAND device and the inversion seeds comprise inversion seeds for most significant bit, center most significant bit, center least significant bit, and least significant bit pages.

In one embodiment of this method, the bit-flipping of the data sequence comprises bit-flipping bits for a page of data to be stored in the memory.

In this embodiment, the bit-flipping transitions the data to be stored from an initial program state to a final program state of the memory.

In one embodiment of this method, a number of transitions from the initial program state to the final program state approaches uniformity between all program states in the memory.

In one embodiment of this method, the number of transitions from the initial program state to the final program state is distributed between all program states in the memory with a deviation ranging from 0.01% to 2%.

Memory System

In another embodiment of the present invention, there is provided a memory system (such as in FIG. 3) having a memory (such as for example storage 507 in FIG. 5). a randomizer (such as for example randomizer 505 in FIG. 5) coupled to the memory, and a data inverter (such as for example data inverter 501 in FIG. 5) coupled to the randomizer. The data inverter is configured to: receive a data sequence including user data and meta data having an inversion seed bit; determine a value for the inversion seed bit from a look up table specifying inversion seeds for different pages of data to be stored in the memory; and depending on the value of the inversion seed, bit-flip the data sequence except for the inversion seed bit. The randomizer is configured (regardless of bit-flipping) to exclusive OR (XOR) the data sequence with a random sequence R for storage in the memory as randomized data.

In one embodiment of the memory system, there is provided an encoder configured to: append an error correction code to the data sequence prior to XORing of the data sequence with the random sequence, and send the XORed sequence to the memory for storage as the randomized data.

In one embodiment of the memory system, there is provided an encoder configured to append an error correction code to the data sequence after XORing of the data sequence with the random sequence, and send the XORed sequence to the memory for storage as the randomized data.

In one embodiment of the memory system, the look up table comprises randomly generated entries generated with a seed comprising a) a physical address where the data sequence is to be stored in the memory and b) a program erase count for the physical address.

In one embodiment of the memory system, the look up table comprising the randomly generated entries comprises inversion seeds for each type of page data to be written to the physical address in the memory.

In one embodiment of the memory system, the memory comprises a triple-level cell (TLC) NAND device, and the inversion seeds comprise inversion seeds for most significant bit, center significant bit, and least significant bit pages.

In one embodiment of the memory system, the memory comprises a quadruple-level cell (QLC) NAND device, and the inversion seeds comprise inversion seeds for most significant bit, center most significant bit, center least significant bit, and least significant bit pages.

In one embodiment of the memory system, the data inverter is configured to bit-flip bits for a page of data to be stored, and the bit-flipping transitions the data to be stored from an initial program state to a final program state of the memory.

In one embodiment of the memory system, a number of transitions from the initial program state to the final program state approaches uniformity between all program states in the memory.

In another embodiment of the memory system, the number of transitions from the initial program state to the final program state is distributed between all program states in the memory with a deviation ranging from 0.01% to 2%.

Although the foregoing embodiments have been described in some detail for purposes of clarity of understanding, the invention is not limited to the details provided. There are many alternative ways of implementing the invention. The disclosed embodiments are illustrative and not restrictive. The present invention is intended to embrace all modifications and alternatives of the disclosed embodiment. Furthermore, the disclosed embodiments may be combined to form additional embodiments.

Indeed, implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be excised from the combination, and the combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for randomizing memory storage data, comprising:

receiving, at a processing circuit, user data and meta data sequence including firmware (FW) meta data having an inversion seed bit;

determining a value for the inversion seed bit from a look up table configured to generate uniform cell state transitions over program erase cycles (PEC) of a storage device, wherein the look up table specifies inversion seeds for different pages of data to be stored in a storage device;

in response to a determination that the value of the inversion seed bit indicates bit-flipping, bit-flipping, by the processing circuit, the user data and meta data sequence except for the inversion seed bit; and regardless of bit-flipping, exclusive ORing (XORing) the user data and meta data sequence with a random sequence to produce an XORed sequence which is stored in the storage device as randomized data.

2. The method of claim 1, further comprising:

appending an error correction code to the data sequence prior to the XORing of the data sequence with the random sequence.

3. The method of claim 1, further comprising:

appending an error correction code to the data sequence after the XORing of the data sequence with the random sequence.

4. The method of claim 1, wherein the look up table comprises randomly generated entries generated with a seed comprising a) a physical address where the data sequence is to be stored in the storage device and b) a program erase count for the physical address.

5. The method of claim 4, wherein the look up table comprising the randomly generated entries comprises inversion seeds for each type of page data to be written to the physical address in the storage device.

6. The method of claim 5, wherein the storage device comprises a triple-level cell (TLC) NAND device, and the inversion seeds comprise inversion seeds for most significant bit, center significant bit, and least significant bit pages.

7. The method of claim 5, wherein the storage device comprises a quadruple-level cell (QLC) NAND device, and the inversion seeds comprise inversion seeds for most significant bit, center most significant bit, center least significant bit, and least significant bit pages.

8. The method of claim 1, wherein the bit-flipping of the data sequence comprises bit-flipping bits for a page of data to be stored, and the bit-flipping transitions the data to be stored from an initial program state to a final program state of the storage device.

9. The method of claim 8, wherein a number of transitions from the initial program state to the final program state is uniform between all program states in the storage device.

10. The method of claim 8, wherein a number of transitions from the initial program state to the final program state is distributed between all program states in the storage device with a deviation ranging from 0.01% to 2%.

11. A memory system, comprising:

a storage device;

a first processing circuit coupled to the storage device; and a second processing circuit coupled to the first processing circuit, wherein the second processing circuit is configured to:

receive a data sequence including user data and meta data including firmware (FW) meta data having an inversion seed bit;

determine a value for the inversion seed bit from a look up table configured to generate uniform cell state transitions over program erase cycles (PECs) of a storage device, wherein the look up table specifies inversion seeds for different pages of data to be stored in the storage device; and in response to a determination that the value of the inversion seed indicates bit-flipping, bit-flip, by the second processing circuit, the data sequence except for the inversion seed bit, and wherein the first processing circuit is configured to, regardless of bit-flipping, exclusive OR (XOR) the data sequence with a random sequence R which is stored in the storage device as randomized data.

12. The memory system of claim 11, further comprising an encoder configured to:

append an error correction code to the data sequence prior to XORing of the data sequence with the random sequence.

13. The memory system of claim 11, further comprising an encoder configured to:

append an error correction code to the data sequence after XORing of the data sequence with the random sequence.

14. The memory system of claim 11, wherein the look up table comprises randomly generated entries generated with a seed comprising a) a physical address where the data sequence is to be stored in the storage device and b) a program erase count for the physical address.

15. The memory system of claim 14, wherein the look up table comprising the randomly generated entries comprises inversion seeds for each type of page data to be written to the physical address in the storage device.

16. The memory system of claim 15, wherein the storage device comprises a triple-level cell (TLC) NAND device, and the inversion seeds comprise inversion seeds for most significant bit, center significant bit, and least significant bit pages.

17. The memory system of claim 15, wherein the storage device comprises a quadruple-level cell (QLC) NAND device, and the inversion seeds comprise inversion seeds for most significant bit, center most significant bit, center least significant bit, and least significant bit pages.

18. The memory system of claim 11, wherein the processing circuit is configured to bit-flip bits for a page of data to be stored, and the bit-flipping transitions the data to be stored from an initial program state to a final program state of the storage device.

19. The memory system of claim 18, wherein a number of transitions from the initial program state to the final program state is uniform between all program states in the storage device.

20. The memory system of claim 18, wherein the number of transitions from the initial program state to the final program state is distributed between all program states in the storage device with a deviation ranging from 0.01% to 2%.

* * * * *